June 20, 1961  H. J. BUTLER  2,989,152
BRAKING SYSTEM FOR ROLLING STOCK
Filed May 19, 1959  10 Sheets-Sheet 1
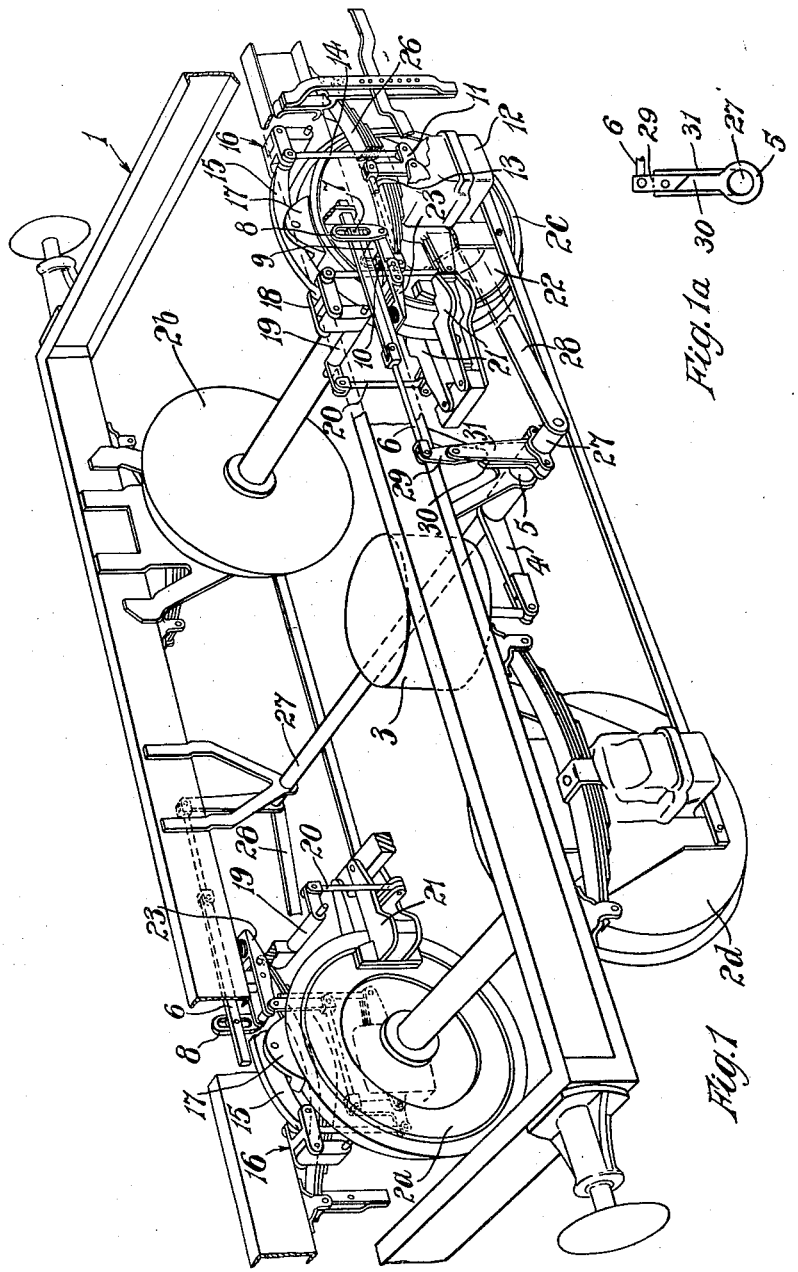
INVENTOR
Henry James Butler
by Benj. T. Rauber
his attorney

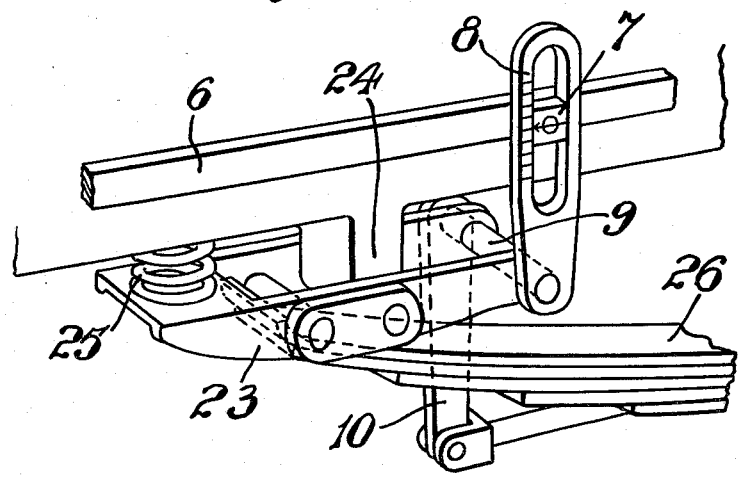
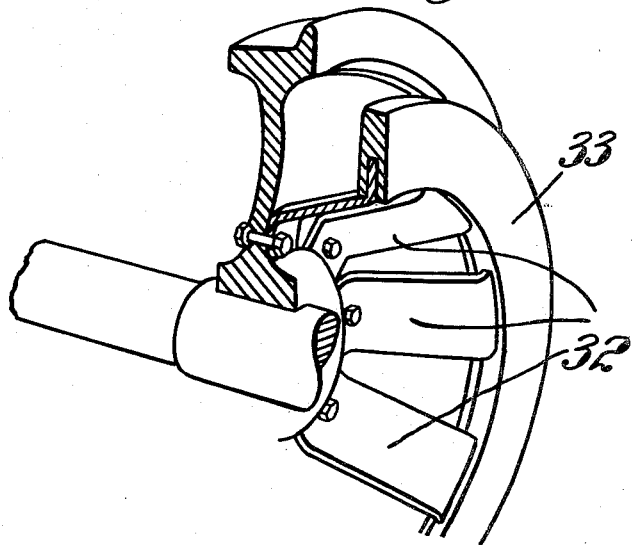

June 20, 1961   H. J. BUTLER   2,989,152
BRAKING SYSTEM FOR ROLLING STOCK
Filed May 19, 1959   10 Sheets-Sheet 3
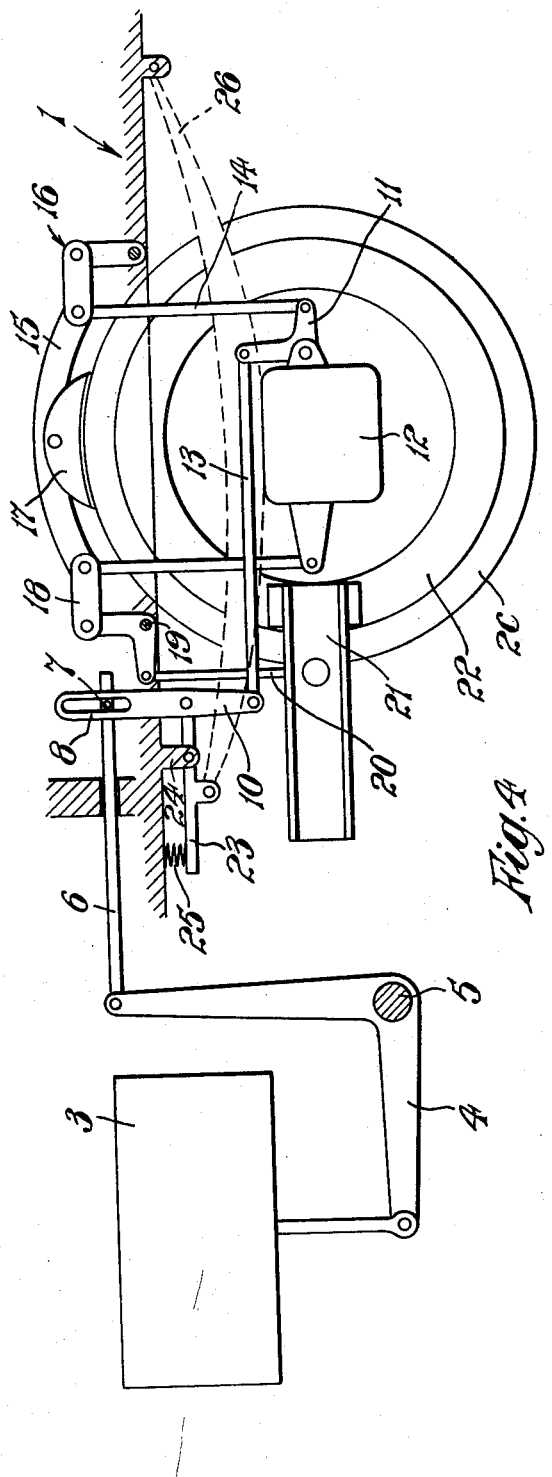

June 20, 1961 H. J. BUTLER 2,989,152
BRAKING SYSTEM FOR ROLLING STOCK
Filed May 19, 1959 10 Sheets-Sheet 4
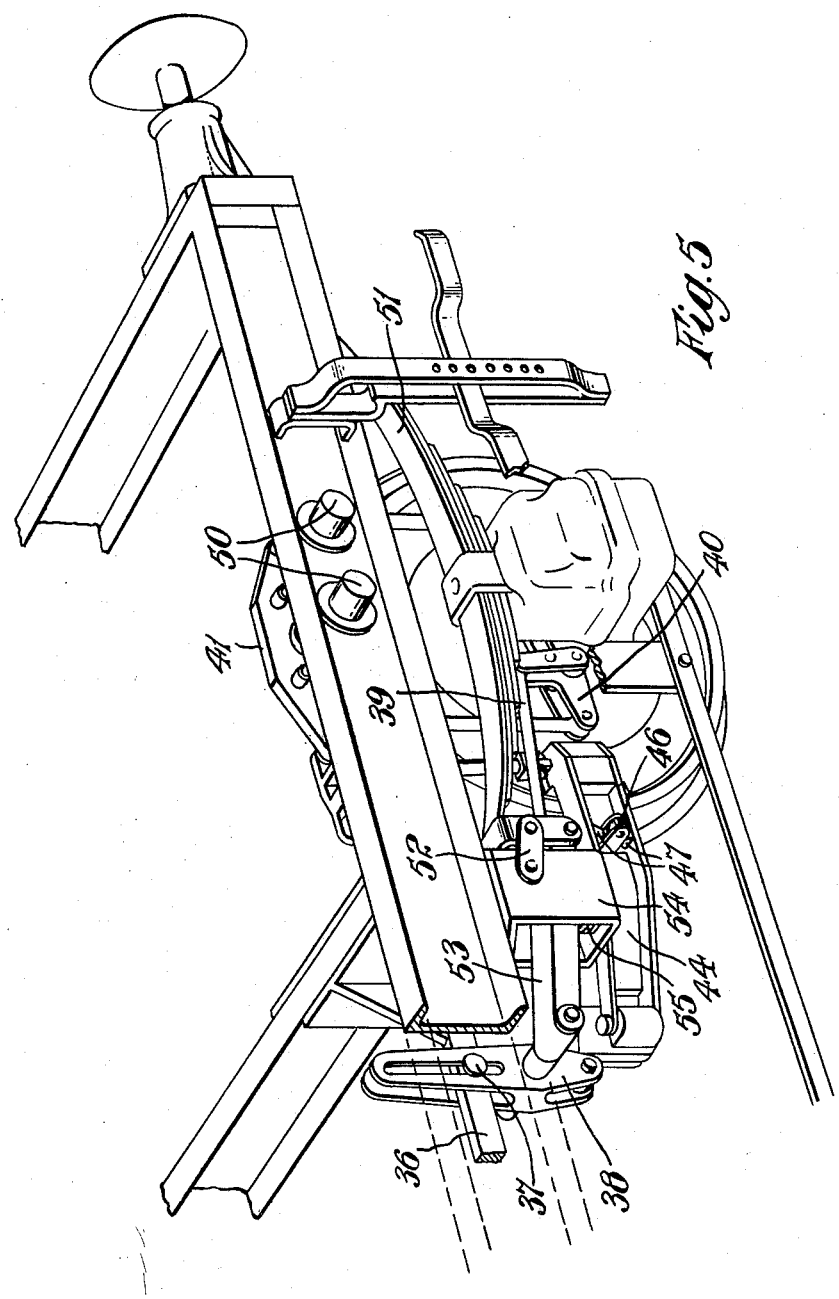
INVENTOR
Henry James Butler
by Benj. T. Pauber
his attorney June 20, 1961 H. J. BUTLER 2,989,152
BRAKING SYSTEM FOR ROLLING STOCK
Filed May 19, 1959 10 Sheets—Sheet 5
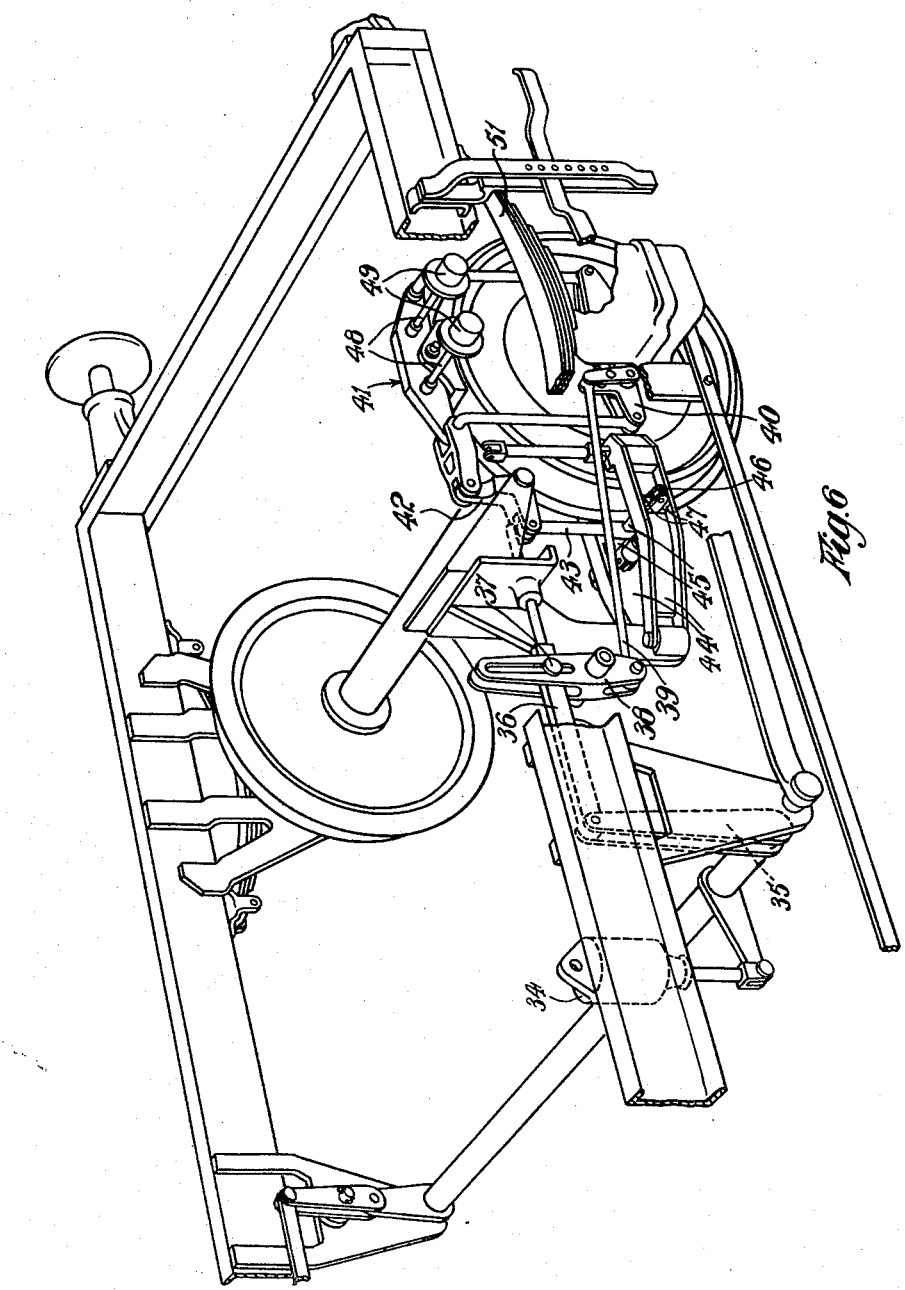
INVENTOR
Henry James Butler
by Benj. T. Rauber
his attorney June 20, 1961 H. J. BUTLER 2,989,152
BRAKING SYSTEM FOR ROLLING STOCK
Filed May 19, 1959 10 Sheets-Sheet 6
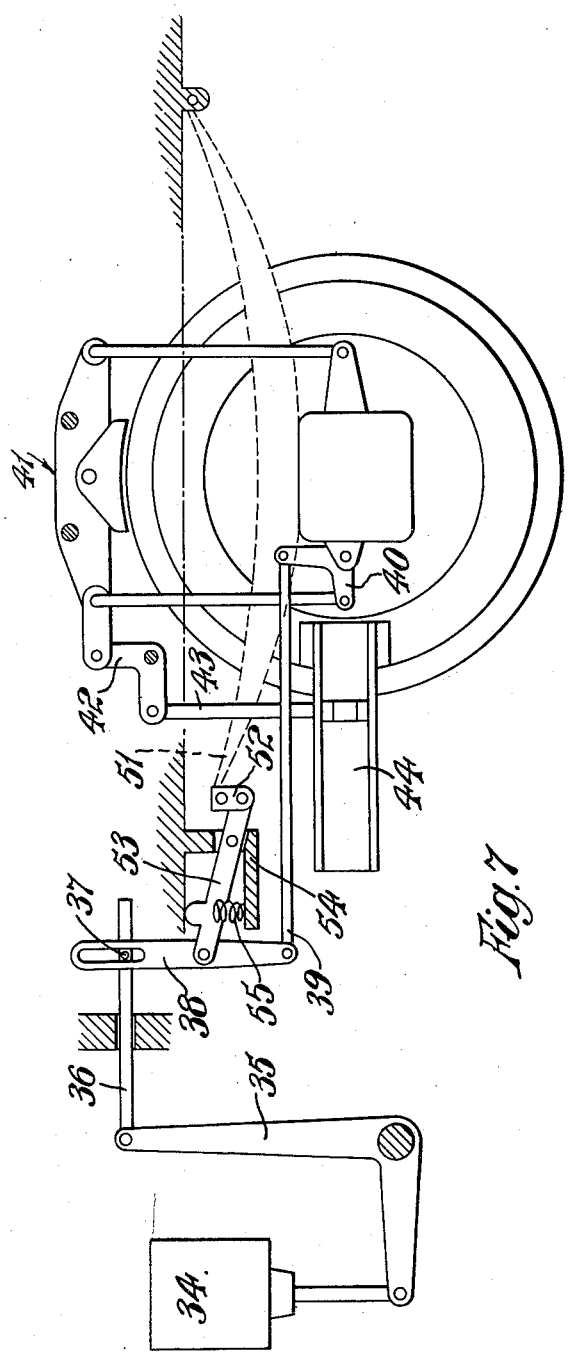

June 20, 1961 H. J. BUTLER 2,989,152
BRAKING SYSTEM FOR ROLLING STOCK
Filed May 19, 1959 10 Sheets-Sheet 7
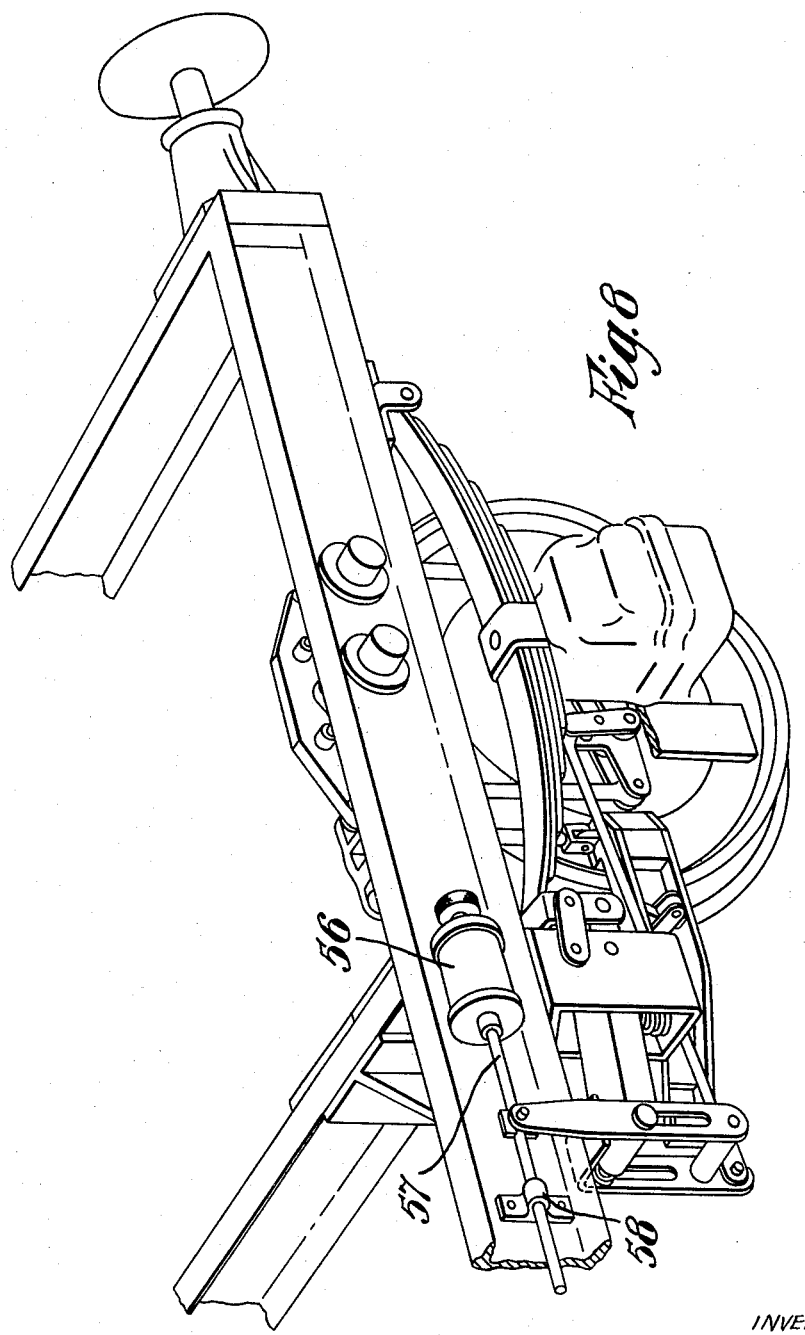
INVENTOR
Henry James Butler
by Benj. T. Rauba
his attorney June 20, 1961    H. J. BUTLER    2,989,152
BRAKING SYSTEM FOR ROLLING STOCK
Filed May 19, 1959    10 Sheets-Sheet 8

INVENTOR
Henry James Butler
by Benj. T. Reuber
his attorney

June 20, 1961 H. J. BUTLER 2,989,152
BRAKING SYSTEM FOR ROLLING STOCK
Filed May 19, 1959 10 Sheets-Sheet 9

INVENTOR
Henry James Butler
by Benj. T. Rauber
his attorney

June 20, 1961 H. J. BUTLER 2,989,152
BRAKING SYSTEM FOR ROLLING STOCK
Filed May 19, 1959 10 Sheets-Sheet 10
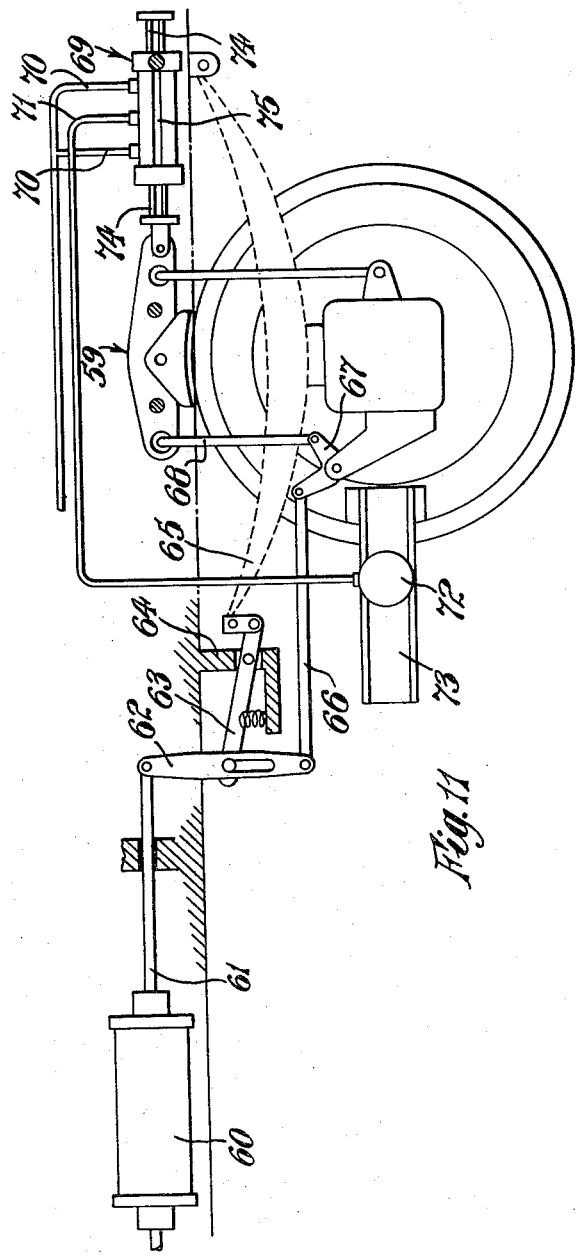

United States Patent Office 2,989,152
Patented June 20, 1961

2,989,152
BRAKING SYSTEM FOR ROLLING STOCK
Henry James Butler, Sutton Coldfield, England, assignor to Dunlop Rubber Company Limited, London, England, a British company
Filed May 19, 1959, Ser. No. 814,277
Claims priority, application Great Britain May 27, 1958
19 Claims. (Cl. 188—195)

This invention relates to a raking system for vehicles and more particularly relates to a load-responsive braking system for rolling stock such as railway wagons.

Load responsive braking systems for railway vehicles are known whereby the braking effort selectively applied by an operator through an actuating device may be varied in accordance with the total load carried by the vehicle whereby the braking load actually effected at the wheel brakes is substantially proportional to the load carried by the vehicle.

The object of the present invention is to provide an improved braking system of this general kind. Another object of the invention is to provide a load-responsive braking system which also includes a skid-sensing device to prevent excessive application of the wheel brakes.

According to the present invention a braking system for a vehicle wherein each wheel brake is applied through a lever mechanism the ratio of which is varied automatically in accordance with the load carried by the wheel whereby the braking force is increased with an increase in said load.

According to the invention also a braking system for a rail vehicle comprises a monitor brake and a main brake both associated with a wheel of said vehicle, means actuated by said monitor brake for applying said main brake and originating means under the control of an operator for applying said monitor brake, said originating means including a lever mechanism the ratio of which is varied automatically in accordance with the load carried by said wheel whereby the braking force applied to the monitor brake and hence to the main brake is automatically increased in accordance with an increase in said load.

Preferably the lever mechanism pivots about one end of a beam which is associated with the conventional wheel spring, whereby deflection of the spring, caused by an increase in load, varies the position of the beam and hence varies the mechanical advantage of the lever mechanism.

The monitor brake, which acts as a skid-sensing device, is preferably mechanically applied by the lever mechanism. The main brake, however, may be mechanically applied or applied through fluid pressure means.

Reference will now be made to the accompanying drawings, of which:

FIGURE 1 is a perspective view of a railway wagon constructed in accordance with one embodiment of the present invention.

FIGURE 1a is an alternative equalizer assembly.

FIGURE 2 is a detail of the load-responsive device of FIGURE 1.

FIGURE 3 is a detail of an alternative wheel and disc brake assembly.

FIGURE 4 is a functional diagram of the system of FIGURE 1.

FIGURE 5 is a perspective view of an alternative braking system.

FIGURE 6 is a similar view in greater detail, some of the detail of FIGURE 5 being omitted.

FIGURE 7 is a functional diagram of the system of FIGURES 5 and 6.

FIGURE 8 is a perspective view of another embodiment of the invention.

FIGURE 11 is a functional diagram of the system of FIGURES 9 and 10.

Figure 9:
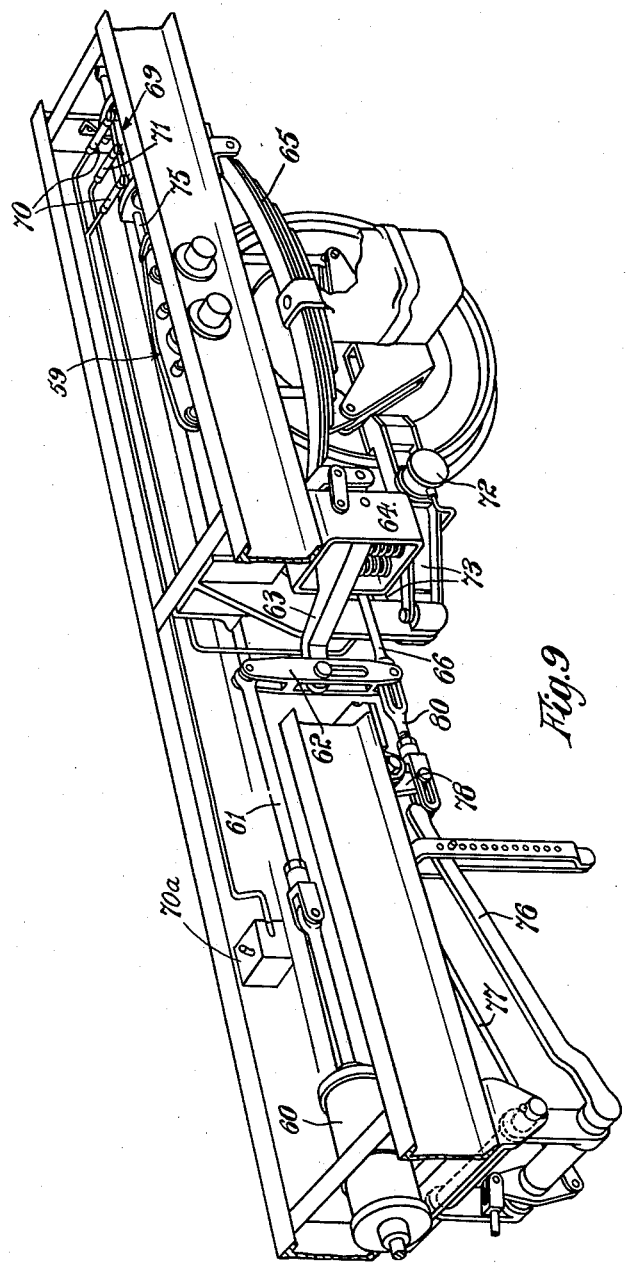
FIGURE 9 is a perspective view of yet a further embodiment of the invention, a part thereof being cut away for easy reference.

FIGURES 1-4 show a braking system for a railway wagon 1 having four wheels 2a, 2b, 2c and 2d in which the diagonally-opposite wheels 2a and 2c only are braked.

It comprises a substantially centrally-located vacuum cylinder 3 selectively connected, through a driver's control (not illustrated) to a source of sub-atmospheric pressure in the normal manner. The vacuum cylinder, when operated, swings a radius arm 4 in a clock-wise direction, as illustrated in FIGURES 1 and 4, and this, acting through a sleeve 5 and a load-compensating mechanism to be later described, pulls on an operating rod 6 longitudinally slidable relative to the wagon frame in slides provided for that purpose.

Rotatably secured to one side of said rod is a rectangular button 7 and slidable on said button within certain limits in a substantially vertical direction is a slotted slide 8, the lower end of which is non-rotatably secured to one end of a spindle 9 which extends in a direction parallel to the axis of the associated wheel 2c and to the other end of which is non-rotatably secured an arm 10 which extends downwardly in the same direction as the slide. A bell crank lever 11 is pivotally secured at its central portion to the junction box 12 for the wheel axle and a push-rod 13 connects one end of said bell crank lever to the lower end of said arm 10 and a pull-rod 14 connects the other end of said bell-crank lever to a monitor brake.

The monitor brake comprises a substantially arcuate arm 15 located vertically above the wheel rim which is connected at one end by an articulated linkage 16 to the wagon frame so that the arm 15 is constrained to move only in a direction away from or towards said arm 10 and in either circumferential direction relative thereto. The pull-rod 14 from the bell crank lever is connected to this end of the arcuate arm. Pivotally secured to the centre of the arm 15 is a cast iron brake block 17 to frictionally engage said rim. The other end of the arm is connected by another articulated linkage 18 to a shaft 19 mounted in bearings in the wagon frame and rotatable on circumferential movement of the arm 15 in either direction. An arm 20 is secured to said shaft and angular movement thereof in either direction operates a main disc brake comprising angularly movable pressure plates 21 one on each side of a disc 22 comprising the web of the wheel. This disc brake construction is fully described in said co-pending application.

Associated with the slide 8, hereinabove described, is a platform member 23 which is pivotally secured at its centre to a lug 24 extending downwardly from the wagon frame and one end of the platform member is rotatably mounted on the spindle 9 extending axially from the lower end of the slide. A spring of predetermined rating which may comprise a helically wound spring as shown at 25 in FIGURE 2, or Belleville washers or a rubber member, is located in compression between the other end of the platform member and the lower side of the wagon frame and pivotally secured to the platform member intermediate said helical spring and said lug is one end of the semi-elliptic spring 26 supporting the wheel, the other end thereof being shackled in the normal manner to the wagon frame.

The rating of the helical spring 25 and the disposition of parts is such that when the wagon is unloaded the helical spring forces the associated end of the platform member 23 downwardly against the upwards force exerted by the substantially-unloaded semi-elliptic spring 26 and the other end of the platform member, moving upwardly, carries with it the slide 8, spindle 9 and arm 10 until the button 7 on the operating rod lies adjacent or abuts the lower end of the slot in the slide. As the load on the wagon increases, the load on the semi-elliptic spring correspondingly increases so that the upward load exerted by one end of said semi-elliptic spring, acting against the helical compression spring, moves the associated end of the platform member upwardly until, when the wagon is fully loaded, the slide is in such a position that the button on the operating rod lies adjacent to or abuts the upper end of the slot in the slide. With the wagon only partially loaded the button lies intermediate the ends of the said slot. The slide may be provided with suitable markings which co-operate with a mark on the button to indicate the load carried.

The slide and its associated spindle and arm form, in effect, a single lever, fulcrumed about the spindle the arrangement being such that the ratio of the effective length of the slide, i.e. the distance from the button to the spindle, to the effective length of the arm, varies with a variation in the loading of the wagon. For example, with an unloaded wagon this ratio may be of the order of 1:3, whilst when the wagon is fully loaded the ratio may be of the order of 1:1. The arrangement is seen to best effect in diagrammatic FIGURE 11.

A braking system of the kind described is associated with each of two diagonally-opposite wheels of the wagon each system being operated by a common vacuum cylinder. In describing the braking system of one wheel it is understood that this applies also to the system associated with the diagonally opposite wheel.

Assuming first of all that the wagon is unloaded and the slide is in such a position that the button on the operating rod lies adjacent the bottom of the slot in the slide. On operation of the vacuum cylinder 3 to apply the brake the operating rod 6 is moved to the left, as seen in FIGURES 1 and 4, and the button on the operating rod angularly moves the slide in an anti-clockwise direction, the spindle and arm also rotating in this direction. The arm moves the push-rod 13 to the right thereby angularly moving the bell-crank lever 11 in a clockwise direction which in turn pulls on the pull-rod 14 to draw the arm 15 of the monitor brake downwardly and press the brake shoe 17 associated therewith against the wheel rim. With the wheel rotating the monitor shoe is forced circumferentially in the direction of rotation of the wheel and this movement of the arm, acting through the articulated linkage 18 rotates the shaft 19 to apply the main brake.

The advantages of the monitor brake block, which relates the main braking substantially to the co-efficient of friction obtaining between the rail and the wheel rim, are described in co-pending application Serial No. 683,096, filed September 10, 1957. A further advantage, not before described, is that since the main braking is conditioned by the monitor brake it cannot exceed a value determined by the monitor brake. This is particularly helpful when braking at high speed when adhesion between wheel and rail may be at its lowest value. If the main brake, which is not subject to fade, should be applied fiercely under such conditions, the wheels would merely skid without substantially decelerating the wagon and would wear flat in the wheels. The monitor brake, however, comprising in effect a rim shoe brake, is subject to fade, and the characteristic torque fall-off of this brake at high speeds prevents the main brake from being applied so fiercely that the wheels would skid on the rails.

The initial movement of the operating rod and the various levers and linkages operated thereby will take up the clearance between the monitor shoe and the wheel rim and the play in the linkages. Thereafter such movement will cease and an operating force only will be transmitted to the monitor brake, depending upon the degree of actuation of the vacuum cylinder. Similarly initial circumferential movement of the monitor brake will first take up the play and clearances in the main brake and will then increasingly apply the main brake.

The present system differs from systems hitherto described in that the degree of braking effected is determined by the loading of the wagon as well as the amount of actuation of the vacuum cylinder. This is achieved by the variable-ratio slide mechanism described. With the wagon unloaded and the ratio of the lever comprising the slide at a ratio of approximately 1:3 an effort of, say 30 lbs. transmitted through the operating rod will provide a resultant of 10 lbs. in the push rod. As the load decreases the mechanical advantage of the lever automatically decreases so that, with the wagon fully loaded and the lever having a ratio of 1:1 the resultant will equal the effort. Thus, with the same effort of 10 lbs. through the operating rod a resultant of 30 lbs. will be available to actuate the monitor brake.

It will thus be seen that, irrespective of the braking effort determined by the driver of the train through the vacuum cylinder, the actual load at the wheel will be automatically increased in accordance with the loading of individual wagons. Thus the system described will be particularly satisfactory with trains comprising loaded, unloaded or partially loaded wagons, as is frequently the case, since each wagon is braked in accordance with its own individual loading.

The length of the slide and of the arm associated therewith may be varied to suit the requirement of a particular installation. Any apparent mechanical disadvantage may be corrected by making suitable modifications in the other parts of the system, e.g. the proportions of the bell-crank lever may be adjusted, so that the desired resultant at the main brake is obtained.

Both diagonally opposite braking systems are preferably controlled through a common vacuum cylinder and preferably means are provided whereby the braking may be effected simultaneously. In the present system this is achieved and provision is also made for manual braking, by the following means. A shaft 27, extending transversely and rotatably across the wagon frame has at each end a brake-operating handle 28 of conventional kind. The brake operating rod 6 of one of the two brakes has at one end a clevis in which is pivotally located one end of a substantially lozenge-shaped link 29 the other end of which is rounded and is located in a complementary recess in the end of an arm 30 extending radially from one end of the sleeve 5 rotatably mounted on said shaft. The other end of the sleeve is provided with the radius arm 4 pivotally secured at its end to the piston of the vacuum cylinder 3. The shaft 27 is also provided with an arm 31 which extends close to and parallel with the recessed arm 30, the end thereof being pivotally secured to the centre of the lozenge-shaped link 29. The arrangement of parts is such that the effective length of the recessed arm 30 is equal to twice the effective length of the lozenge-shaped link 29, to the centre of which the arm 31 is pivotally secured.

The effect of this arrangement is that when the vacuum cylinder is operated it angularly moves the sleeve 5 in a clockwise direction, as illustrated in FIGURE 1. This rotates the recessed arm 30 in the same direction, carrying with it the adjacent end of the lozenge-shaped link 29. The link pivots about the end of the arm 31, the other end of the link moving in an anti-clockwise direction. The upper end of the link is associated with the operating rod 6 of one monitor brake whilst the arm 31 and shaft 27 are associated with the other brake. The link thus floats freely until frictional engagement is effected between one of the monitor brakes and the wheel when the link will pivot about the end associated with said brake to take up the clearance at the other brake. Thereafter the originating force applied to both brakes through the vacuum cylinder will be equal, although this force may be modified by the weight-responsive means to vary the final braking in accordance with the weight carried by the wheel.

The disc comprising the main brake may comprise two disc parts each detachably secured one to each side of the web of the wheel as illustrated in FIGURE 1, so that each friction pad of the main brake frictionally engages the outer face of each disc part. This arrangement is not entirely satisfactory since the heat is generated on one side only of each disc part which results in distortion. Moreover it is not possible to fit the inboard disc part without removing the wheel from the live axle unless said part is made up from a number of segments, which arrangement is also disadvantageous.

The most obvious place for a brake disc, in any railway wagon disc brake system, is inboard of the wheel and the problem of converting existing wagons without the major step of removing the wheels from the axles may be overcome in the following way. The wheels and axle assembly may be separated from the wagon, e.g. by jacking up the wagon or dropping the assembly and to the inside of each wheel web, adjacent the hub, a number of pressed steel spokes 32 (FIGURE 3) are detachably secured, as by nuts and bolts, the spokes together forming a dished assembly extending axially-inwardly and radially-outwardly of the wheel hub, and an annular disc 33 is cast, in situ, to the outer portions of said spokes, said disc being coaxial with the wheel. The disc can be machined, also in situ, by existing apparatus for trueing the wheel rims. The spokes may of course be replaced by any obvious equivalent, such as two halves which together form a substantially frusto-conical assembly. This method can be used for any railway wagon disc brake conversion.

FIGURES 5, 6 and 7 show a variation in the braking system described above. This system is operated by means of a hydraulic cylinder 34 (FIGURE 6) situated between diametrically opposite wheels to angularly move arm 35 in a clockwise direction, looking at FIGURE 6 and thereby to push-rod 36. This rod is provided with a button 37 co-operating with a vertically-disposed bifurcated slide 38 to the lower end of which is pivotally secured a pull-rod 39 which is in turn pivotally secured to one end of a bell-crank lever 40 secured to the axle box. The other end of the bell-crank lever is linked to one end of a monitor shoe assembly 41, which is pivotally secured intermediate its ends to the vehicle frame and is pivotally secured at its other end to a vertical rod 43 adapted to actuate the main brake.

The main brake comprises a pair of pincer arms 44 having friction material secured to the ends thereof adjacent the braking surface of the wheel. Each arm is slotted to enable a cross piece 45 extending at right angles from the bottom of the rod 43 to pass therethrough and a roller 46 is provided at each end of said cross-piece to co-operate with a double-acting cam face 47 formed on said pincer arms, the arrangement being such that vertical movement of said rod 43 and cross-piece 45, acting through the rollers and cam surface will apply the brake. Thus the brake may be applied irrespective of the direction of rotation of the monitor brake.

In this embodiment of the invention the arcuate arm of the monitor brake is movable in a vertical direction, to apply and release the monitor brake, and in a circumferential direction, to apply and release the main brake, by virtue of its resilient connection with the vehicle frame. A pair of rods 48, extending axially from one side of the arcuate arm of the monitor brake have resilient bushes 49 (FIGURE 6) bonded to their ends and these are located in cups 50 (FIGURE 5) secured to the vehicle frame.

One end of the semi-elliptic spring 51 is shackled in the normal way to the frame. The other end, adjacent the slide 38, is secured, through linkage 52, to one end of a beam 53 pivotally secured within a housing 54 depending from the frame. The other end of the beam is pivotally secured to the slide 38 intermediate its ends. A helical compression spring 55 is fitted in compression between the floor of the housing and the beam.

This system operates in a manner analogous to that previously described, that is to say, actuation of the hydraulic cylinder 34, acting through the arm 35 and push-rod 36 rocks the slide about the end of the beam 53 and this, acting through the pull-rod 39 and bellcrank lever 40 applies the monitor brake 41, the resilient bushes 49 enabling this movement to take place and also allowing a limited circumferential movement in either direction when said monitor brake is applied.

This circumferential movement rocks the bellcrank lever 42 to apply the main brake in the manner described. Variations in the loading on the wagon, acting through the end of the spring 51 associated with the beam 53 angularly move said beam in accordance with said load and this, as in the last embodiment of the invention, alters the mechanical advantage of the slide.

In certain applications it may be disadvantageous to have a vacuum or pressure brake-applying cylinder located in the centre of the frame and in a further embodiment of the invention, illustrated in FIGURE 8, a braking system for a hopper-wagon, in which the load is discharged vertically through the frame, is described. This embodiment is identical with that previously described with reference to FIGURES 5, 6 and 7 except each wheel brake is individually applied through the medium of an hydraulic piston and cylinder mechanism 56 having a piston rod 57 extending therefrom and working in a guide 58 and the upper end of the slide is pivotally secured to said piston rod. Each piston and cylinder mechanism, one to each wheel to be braked, is connected to a source of hydraulic pressure through a driver's control and the arrangement enables each wheel braking system to be self-contained and grouped around that wheel.

Alternatively a single cylinder containing a pair of pistons may be positioned centrally between the wheels on the same side of the frame, each piston being connected to a wheel braking system.

Figure 10:
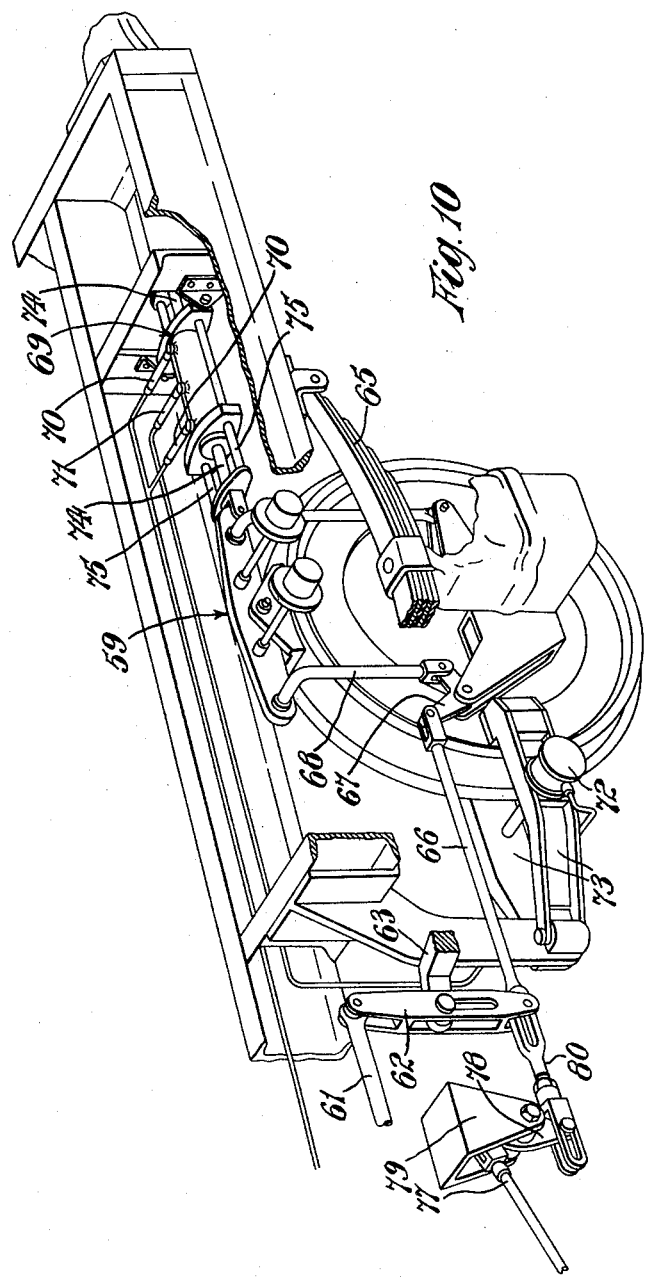
FIGURE 10 is a similar view showing details not seen in FIGURE 9.

Whilst it is preferred that the monitor brake should be actuated through a lever mechanism and associated linkage, the main brake need not necessarily also be mechanically operated and in a further embodiment of the invention, illustrated in FIGURES 9, 10 and 11, the monitor brake 59 is actuated by means of an hydraulic piston and cylinder mechanism 60, selectively operable by the driver of the train and located between a pair of wheels on the same side of the wagon and arranged to operate the braking systems of both wheels.

Each such system, insofar as it relates to the mechanism for applying the monitor brake, is substantially the same as that described above with reference to FIGURE 8 and comprises a pull-rod 61 associated at one end with said mechanism 60 and at the other end with a lever 62 which pivots about one end of a beam 63 which is angularly movable in a housing 64 secured to the wagon frame and the other end of which is associated with one end of the semi-elliptic spring 65. Angular movement of the lever 62, acting through push-rod 66, bell-crank lever 67 and link 68, operates the monitor brake in the manner described.

A double-acting master-cylinder 69 is pivotally secured at one end to said frame and has conduits 70 at each end leading to an hydraulic reservoir 70a and a central conduit 71 leading to the cylinder 72 of a mechanism for applying the main brake which latter comprises a pair of angularly-movable pressure plates 73. A piston (not illustrated) is slidable in each end of the cylinder, each piston having a piston rod 74 extending therefrom and outwardly of the associated end of the cylinder. A rectangular stirrup 75, pivotally secured to the monitor brake assembly, slidably encircles the cylinder on its longitudinal axis the sides thereof each abutting an associated piston rod. The arrangement is such that circumferential movement of the monitor brake in either direction will force one of the pistons inwardly against a spring to pressurize the liquid in the cylinder and thereby apply the main brake.

Alternatively two single-acting master-cylinders may be employed one on each side of the monitor brake, one of the two being actuated to operate the main brake in either direction of rotation of the wheel.

In this embodiment of the invention also the handbrake 76 for applying the brakes manually operates through a rod 77 which is connected to one end of a lever 78 pivoted between its ends in a bracket 79 secured to the frame. The other end of the lever is connected to the lower end of the lever 62 through a link 80 having two lost-motion slots, one at each end. With the brakes inoperative the disposition of the part is as illustrated in FIGURES 9, 10 and 11, the arrangement being such that the brake can be applied through either of the operating means, i.e. the hand-lever or the hydraulic cylinder, without affecting the other means.

Having now described my invention—what I claim is:

1. A braking system for a rail vehicle comprising a monitor brake and a main brake both associated with a wheel of said vehicle, means actuated by said monitor brake for applying said main brake and originating means under the control of an operator for applying said monitor brake, said originating means including a lever mechanism the ratio of which is varied automatically in accordance with the load carried by said wheel whereby the braking force applied to the monitor brake and hence to the main brake is automatically increased in accordance with an increase in said load.

2. A braking system according to claim 1 wherein said lever mechanism comprises a lever pivoted on a fulcrum and having one force receiving arm and a second arm connected to deliver force to said monitor brake, said lever being movable lengthwise in response to an increase in load on said wheel to vary the relative effective lengths of said arms.

3. A braking system according to claim 1 wherein said lever mechanism comprises a fulcrum and a lever fulcrumed between its ends on said fulcrum, said fulcrum being slidable toward and from one end of said lever in response to an increase in load on said wheel to vary the ratio of said member.

4. The braking system of claim 1 having a second main brake rotated by a second wheel, a second monitor brake, a second lever mechanism the ratio of which is varied automatically in accordance with the load carried by said wheel and an equalizing means between said originating means and said lever mechanism to move each said monitor brake into frictional engagement with its wheel before pressure is applied on said brakes.

5. The braking system of claim 4 in which said main and monitor brakes are associated with wheels on separate, individual axles.

6. The braking system of claim 4 in which said equalizing means comprises a first shaft actuating one of said monitor brakes and having a crank arm, a second shaft coaxial with said first shaft and rotatable relative thereto on their common axis and having a second crank arm and a lever pivoted on said second crank arm in position to be engaged by said first crank arm on rotation in the brake actuating direction and connected to the other monitor brake, one of said shafts being engaged and driven by said originating means.

7. The braking system of claim 1 in which said lever mechanism comprises a lever having one arm connected to the originating means and the other arm connected to the monitor brake and having a slot between said arms and a supporting fulcrum slidable in said slot to vary the ratio of said arms.

8. The braking system of claim 1 having a pressure fluid system comprising a master cylinder actuated by said monitor brake and a piston and cylinder actuating said main brake and connected to said master cylinder.

9. A braking system according to claim 1 wherein said originating means comprises an actuating device, a linkage between said actuating device and one arm of said lever mechanism and a linkage between the other end of said lever mechanism and said monitor brake whereby actuation of said device, acting through the linkages and the lever mechanism, moves the monitor brake into frictional engagement with the wheel rim.

10. A braking system according to claim 9 wherein said monitor brake is mounted for limited circumferential movement when frictionally engaging a rotating wheel and means, actuated by said movement, for applying said main brake.

11. A braking system according to claim 2 wherein said fulcrum comprises one end of a beam pivotally secured intermediate its ends to the chassis of said vehicle, the other end of said beam being associated with the spring of said wheel, whereby angular movement of said beam, to vary the ratio of said member, is proportional to the deflection of said spring.

12. A braking system according to claim 11 wherein a secondary spring is interposed between said beam and the vehicle frame or a part thereof to maintain said beam in a predetermined angular position when the wheel is unloaded and the wheel spring substantially undeflected.

13. A braking system according to claim 12 wherein said wheel spring is a semi-elliptic spring, one end thereof being shackled to the said frame and the other end linked to one end of said beam.

14. A braking system according to claim 10 wherein said main brake comprises a disc driven by said wheel and a pair of angularly-movable pressure members axially-aligned one on each side of said disc, friction material secured to said members to frictionally engage the disc and a mechanism to angularly move said members towards said disc.

15. A braking system according to claim 14 wherein said means actuated by movement of the monitor brake comprises a double-acting hydraulic master-cylinder and the mechanism to apply the main brake comprises a piston and cylinder mechanism operatively connected to said master cylinder, whereby circumferential movement of the monitor brake in either direction operates the master-cylinder to apply the main brake.

16. A braking system according to claim 9 wherein said actuating device is positioned to operate a wheel braking system acting on diagonally-opposite wheels of said vehicle.

17. A braking system according to claim 9 wherein said actuating device is positioned to operate a wheel braking system acting on the wheels on one side of the vehicle.

18. A braking system according to claim 16 wherein said actuating device comprises an hydraulic mechanism.

19. A braking system according to claim 9 wherein said actuation device is a handbrake connected to said linkage by a lost-motion device whereby said system may be operated by said handbrake.

References Cited in the file of this patent

UNITED STATES PATENTS

| | | |
|---|---|---|
| 2,001,327 | Johnson | May 14, 1935 |
| 2,185,003 | Stoddard | Dec. 26, 1939 |
| 2,751,046 | Tack | June 19, 1956 |
| 2,885,034 | Holin | May 5, 1959 |